J. BIOLOŻYT ET AL
POTATO PLANTER
Filed Jan. 24, 1923
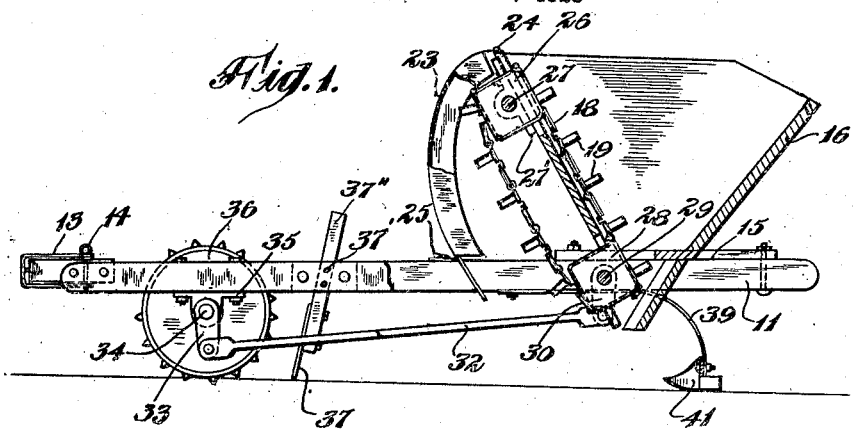
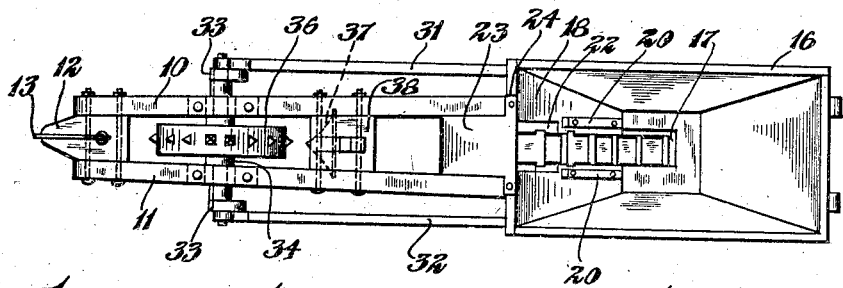
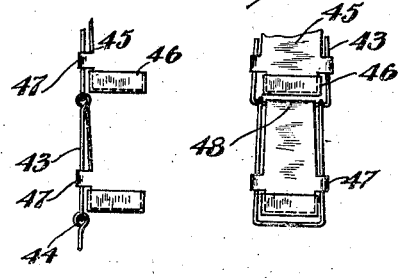
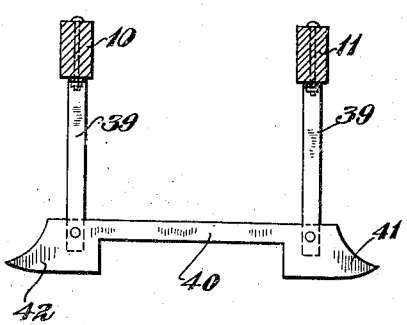
INVENTOR
Jan Bioloźyt
BY Frank Holexa
George C. Heinicke
ATTORNEY Patented June 10, 1924.

1,497,537

UNITED STATES PATENT OFFICE.

JAN BIOLOŻYT AND FRANK HOLEXA, OF HARTFORD, ARKANSAS.

POTATO PLANTER.

Application filed January 24, 1923. Serial No. 614,604.

*To all whom it may concern:*

Be it known that I, JAN BIOLOŻYT, a citizen of Poland, residing at Hartford, county of Sebastian, and State of Arkansas, and I, FRANK HOLEXA, a citizen of Poland, residing at Hartford, county of Sebastian, and State of Arkansas, have invented certain new and useful Improvements in Potato Planters, of which the following is a specification.

This invention relates to improvements in agricultural implements, particularly potato planters, and it is the principal object of my invention to provide a planter of simple construction combining a furrow opening plow in front of, and a furrow covering element in rear of the planting device.

A further object of the invention is the provision of a conveyor of peculiar construction for feeding the seed potatoes which is operated from the traction wheel of the plow.

With these and other objects in view, which will become more fully apparent as the description proceeds, and will then be more specifically pointed out in the appended claims, my invention consists in the novel construction, arrangement of parts and combination of elements illustrated in the accompanying drawing forming a material part of this disclosure, in which:

Figure 1 is a side view of a planter constructed according to the present invention, partly in section to illustrate the parts within the hopper.

Figure 2 is a top plan view of the planter.

Figures 3 and 4 illustrate the construction of the conveyor in end and side views, and Figure 5 is a front view of the furrow closing element.

The planter comprises a frame composed of converging side bars 10 and 11 united at their front ends by a block 2 carrying a metal frame or loop 13 attached thereto by means of a bolt 14 for the attachment of the swingle tree to which the harness of a draft animal is secured. The opposite ends of the side bars 10 and 11 are united by the bottom plate 15 of a hopper 16 of ordinary, well known construction having an opening 17 in its bottom plate for allowing the passage of an endless conveyor 18 carrying a plurality of buckets 19 for the reception of the seed potatoes placed within the hopper 16.

This conveyor is guided between guide strips 20 and 21 secured to one of the end walls of the hopper to both sides of the conveyor. This hopper well is provided with an opening 22, while a protecting hood 23 protects the conveyor outside of the hopper. This hood is secured as at 24 to the upper edge of the end wall of the hopper provided with the opening, while its lower end is secured to the bars 10 and 11, as at 25 to extend downwardly between the same. In the opening 22 of the hopper end wall, a square conveyor wheel 26 is rotatably mounted on a transverse shaft 27 journaled in a bracket 27' attached to the outer end wall of the hopper, and a motor wheel 28 of similar construction is mounted on a shaft 29 journaled with its ends in bars 10 and 11. Shaft 29 carries crank arms 30, to the lower ends of which operating rods 31 and 32 are secured, the opposite ends of which are attached to crank arms 33 on a shaft 34 journaled in brackets 35 secured to the lower edges of bars 10 and 11.

Between these bars, shaft 34 carries a tractor wheel 36. Behind wheel 36 a furrow opener or plow share 37 is mounted for adjustment by means of pins 37' passing through beam 37'' and a block 38 secured between bars 10 and 11.

To the lower edge of the bars 10 and 11, near their rear ends are secured curved bars 39 connected at their lower ends by means of a bar 40 which carries at its outer ends furrow closers 41 and 42.

The conveyor is constructed of a frame composed of a plurality of wire loops 43 provided with eyes 44 through which the end bar of the adjoining loop is guided in the manner illustrated in Figures 3 and 4. Plates 45 with which the buckets 46 are integrally made are attached to the longitudinal bars of loop 43 by means of lateral projections 47 integral with plates 45, near their lower ends, and projecting beyond the side edges thereof and guided around wires 43, while the upper ends of plates 45 are rolled around the end bars of the preceding loops as indicated at 48.

The operation of the device will be clear from the above description.

The seed potatoes are placed into the hopper, and are removed from the same by means of the conveyor which is operated from tractor wheel 36 as the plow 37 is pulled along the ground by the animal to open a furrow into which the seed potatoes are planted, while the furrow closing elements 41 and 42 will close the furrow and cover the planted potatoes with soil.

It will be clear that changes may be made in the general arrangement and in the construction of the minor details of my invention without departing from the scope and spirit thereof, however what I claim as new and desire to secure by Letters Patent of the United States is:

In a planter of the class described, a conveyor composed of a plurality of interlocking wire loops by passing the end bar of one loop through eyes formed with the next adjoining loop, plates provided with lateral projections for engaging the side bars of said loops near their lower ends, and having their material at their upper ends rolled around the connecting end bar of the adjoining loop, and a plurality of buckets integrally formed with said plates.

In testimony whereof we have affixed our signatures.

JAN BIOLOŻYT.
FRANK HOLEXA.